(12) United States Patent
Bax et al.

(10) Patent No.: US 7,584,173 B2
(45) Date of Patent: Sep. 1, 2009

(54) EDIT DISTANCE STRING SEARCH

(75) Inventors: Eric Theodore Bax, Altadeua, CA (US); Ian Douglas Swett, Pasadena, CA (US)

(73) Assignee: Avaya Inc., Basking Ridge, NJ (US)

( * ) Notice: Subject to any disclaimer, the term of this patent is extended or adjusted under 35 U.S.C. 154(b) by 712 days.

(21) Appl. No.: 10/775,576

(22) Filed: Feb. 9, 2004

(65) Prior Publication Data

US 2004/0220920 A1 Nov. 4, 2004

Related U.S. Application Data

(60) Provisional application No. 60/449,007, filed on Feb. 24, 2003.

(51) Int. Cl.
  *G06F 7/00* (2006.01)
  *G06F 17/30* (2006.01)
(52) U.S. Cl. .................. 707/3; 707/4; 707/5; 707/6
(58) Field of Classification Search .............. 707/2, 707/3; 705/26; 365/145
  See application file for complete search history.

(56) References Cited

U.S. PATENT DOCUMENTS

| | | | | |
|---|---|---|---|---|
| 5,778,361 | A * | 7/1998 | Nanjo et al. ................ | 707/5 |
| 6,401,084 | B1 * | 6/2002 | Ortega et al. ............... | 707/2 |
| 6,556,984 | B1 * | 4/2003 | Zien ............................. | 707/2 |
| 7,010,522 | B1 * | 3/2006 | Jagadish et al. ............ | 707/3 |
| 2002/0072863 | A1 * | 6/2002 | Tomikawa et al. .......... | 702/22 |
| 2004/0141354 | A1 * | 7/2004 | Carnahan ..................... | 365/145 |
| 2004/0143508 | A1 * | 7/2004 | Bohn et al. .................. | 705/26 |

OTHER PUBLICATIONS

Navarro, Gonzalo, "A Guided Tour to Approximate String Matching", Mar. 2001, ACM Computer Surveys, vol. 33 Issue 1, pp.31-88.*
Webb, Geoffrey I. "Efficient Search for Association Rules", 2000, "Proceedings of the sixth ACM SIGKDD international conference on knowledge discovery and data mining", pp. 99-107.*
Webb, Geoffrey I., "Efficient search for association rules", Proceedings of the sixth ACM SIGKDD international conference on knowledge discovery and data mining, Aug. 20-23, 2000, pp. 99-107, Boston, MA, USA.

* cited by examiner

*Primary Examiner*—Charles Rones
*Assistant Examiner*—Charles D Adams
(74) *Attorney, Agent, or Firm*—David Volejnicek

(57) ABSTRACT

A process determines for a search string which, if any, of the strings in a text list have edit distance from the search string less than a threshold. The process uses dynamic programming on a grid with search string characters corresponding to rows and text characters corresponding to columns. For each text string, computation proceeds by columns. If successive text strings share a prefix, then the columns corresponding to the prefix are re-used. If the minimum value in a column is at least the threshold, then the prefix corresponding to that and previous columns causes edit distance to be at least the threshold. So the computation for the present text is abandoned, and computations for any other texts that share the prefix are avoided.

36 Claims, 4 Drawing Sheets

Figure 1: Re-Using Columns that Correspond to a Shared Prefix.

|   |   |   |   |   |   |   |   |
|---|---|---|---|---|---|---|---|
| e | 5 | 4 | 5 | 6 | 5 | 4 | 5 |
| l | 4 | 3 | 4 | 5 | 4 | 5 | 6 |
| p | 3 | 2 | 3 | 4 | 3 | 4 | 5 |
| p | 2 | 1 | 2 | 3 | 4 | 5 | 6 |
| a | 1 | 2 | 3 | 4 | 5 | 6 | 7 |
|   | 0 | 1 | 2 | 3 | 4 | 5 | 6 |
|   |   | p | r | o | p | e | r |

Re-use columns that correspond to a shared prefix.

|   |   |   |   |   |   |   |   |   |   |   |
|---|---|---|---|---|---|---|---|---|---|---|
| e | 5 | 4 | 5 | 6 | 5 | 4 | 5 | 6 | 5 | 6 |
| l | 4 | 3 | 4 | 5 | 4 | 5 | 4 | 5 | 6 | 7 |
| p | 3 | 2 | 3 | 4 | 3 | 4 | 5 | 6 | 7 | 8 |
| p | 2 | 1 | 2 | 3 | 4 | 5 | 6 | 7 | 8 | 9 |
| a | 1 | 2 | 3 | 4 | 5 | 6 | 7 | 8 | 9 | 10 |
|   | 0 | 1 | 2 | 3 | 4 | 5 | 6 | 7 | 8 | 9 |
|   |   | p | r | o | p | e | l | l | e | r |

Figure 2: Preprocessed Text List.

| Text List Index | Text | First Different Character | List of (Prefix, Index of Next Text Lacking Prefix) |
|---|---|---|---|
| 0 | arm | 0 | (a, 2), (ar, 2), (arm, 2) |
| 1 | arms | 3 | |
| 2 | banana | 0 | (b, 5), (ba, 5), (ban, 4) |
| 3 | band | 3 | |
| 4 | bar | 2 | |
| 5 | cab | 0 | (c, 7) |
| 6 | club | 1 | |

Figure 3: Computing Column Bands.

| | | | | | | 4 | 5 |
|---|---|---|---|---|---|---|---|
| s | | | | | | 4 | 5 |
| e | | | | | | 4 | ③ | 4 |
| l | | | | | 4 | ③ | 2 | 3 |
| p | 4 | 5 | 4 | ③ | 2 | ③ | 4 |
| m | ③ | 4 | ③ | 2 | ③ | 4 | |
| i | 2 | ③ | 2 | 3 | 4 | | |
| d | 1 | 2 | 3 | 4 | 5 | | |
| | ⓪ | ① | ② | ③ | 4 | | |
| | s | i | m | p | l | y |

Figure 4: Re-Using Columns that Correspond to Recurrence-Preserving Characters.

|   | | | | | | | | | |
|---|---|---|---|---|---|---|---|---|---|
| k | 5 | 6 | 5 | 6 | 7 | 8 | 7 | 8 | 9 |
| n | 4 | 5 | 4 | 5 | 6 | 7 | 6 | 7 | 8 |
| i | 3 | 4 | 3 | 4 | 5 | 6 | 7 | 8 | 9 |
| r | 2 | 3 | 4 | 5 | 6 | 7 | 8 | 9 | 10 |
| b | 1 | 2 | 3 | 4 | 5 | 6 | 7 | 8 | 9 |
|   | 0 | 1 | 2 | 3 | 4 | 5 | 6 | 7 | 8 |
|   |   | d | i | s | t | a | n | c | e |

A.   B.   C.   D.

|   | | | | | | | | | |
|---|---|---|---|---|---|---|---|---|---|
| k | 5 | 6 | 5 | 6 | 7 | 8 | 9 | 8 | 9 |
| n | 4 | 5 | 4 | 5 | 6 | 7 | 8 | 7 | 8 |
| i | 3 | 4 | 3 | 4 | 5 | 6 | 7 | 8 | 9 |
| r | 2 | 3 | 4 | 5 | 6 | 7 | 8 | 9 | 10 |
| b | 1 | 2 | 3 | 4 | 5 | 6 | 7 | 8 | 9 |
|   | 0 | 1 | 2 | 3 | 4 | 5 | 6 | 7 | 8 |
|   |   | d | i | p | t | h | o | n | g |

EDIT DISTANCE STRING SEARCH

CROSS REFERENCE TO RELATED APPLICATIONS

This application claims the benefit of U.S. Provisional Application No. 60/449,007, filed on Feb. 24, 2003.

STATEMENT REGARDING FEDERALLY SPONSORED RESEARCH OR DEVELOPMENT

Not Applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

A string is a sequence of characters. A string may represent a name or address, e.g., "John Doe" or "PO Box 12345, Big Town, Wash. 67890." Alternatively, a string may represent a biological sequence, e.g., a DNA or mRNA sequence. Characters in a string may be indexed by position. In computer-based applications, the indices usually range from zero to one less than the number of characters, which is also called the length. For example, string "abcdefghij" has length 10; the character in position zero is "a," and the character in position nine is "j."

The need to identify among a set of strings (called a text list) those that are similar to a string (called a search string) occurs in several contexts. For many applications, a search for texts similar to the search string is more useful than a search for exact matches.

For example, consider a system to locate the medical history for an individual among a large set of histories. Suppose the individual writes his or her name and address on a form. Another person transcribes the name and address into a computer to form a name search string and an address search string. Then the computer performs a search among a set of histories that are indexed by name and address strings. The set of history name strings forms a name text list, and the set of history address strings forms an address text list.

One possible method is to search the name text list for an exact match to the name search string, search the address text list for an exact match to the address search string, and report as search results any history that is an exact match for name and address. The problem with this method is that the name and address strings for the individual's medical history may be slightly different from the name and address search strings—there may be errors in transcription, and there may be variations in expressions of the name and address.

For another example, consider an organization that keeps a mailing list of members. The list may contain multiple references to the same member, often collected by different methods or by different instances of the same method. The multiple references to a member often contain strings that are similar but not exact matches. The organization can reduce costs and member aggravation by identifying and removing multiple references to the same member. This process, which is called deduplication, has many other uses, including detection of duplicate benefit payments by government agencies and aggregation of data about a customer with multiple accounts at a financial institution.

Other examples involve bioinformatics. In biology, similar sequences often correspond to similar functionality. For example, similar DNA sequences in different individuals or species can encode proteins with similar functions. So one use of searching for texts similar to a search string is when the texts are biological sequences corresponding to proteins with known functions and the search string is a sequence for which the function is unknown. This type of search could be useful to understand the mechanisms at work in a genetic disease in which a person lacks a known DNA sequence of unknown function.

Some measures of string similarity are called edit distances. A basic edit distance is the minimum number of inserts and deletes needed to convert one string to another. Refer to this measure as "simple edit distance." Strings "wheat" and "whets" have simple edit distance two, because "wheat" can be converted to "whets" by deleting an "a" and inserting an "s." Each insert or delete is called an operation. The contribution to the edit distance for an operation is called the operation cost. Edit distances can involve a variety of operations, such as overwriting one character with another, costs that vary by operation, such as insert being twice as expensive as delete, and costs that vary by operation position, such as operations being more expensive at the beginning of a string than at the end.

Dynamic programming is a method to compute edit distance. A dynamic programming algorithm can be developed as follows. First, determine an ordered set of subproblems that includes the problem itself, and determine a recurrence that defines each subproblem solution in terms of previous subproblem solutions or a constant. Then determine a process to compute each subproblem solution in order, using the recurrence, which may involve solutions to earlier subproblems. Since the problem itself is a subproblem, this process solves the problem.

For example, a dynamic programming algorithm to compute the simple edit distance between a search string and a text can be developed as follows. Call the search string length m and the text length n. Call the substring consisting of the first i characters of a string the i-substring. Define subproblem $S(i,j)$ to be the simple edit distance between the i-substring of the search string and j-substring of the text. Then $S(0,0)$ is zero since no operations are needed to convert an empty string to an empty string. For each i from 1 to m, $S(i,0)$ is i since i deletes are needed to convert the i-substring of the search string to an empty string. Likewise, for each j from 1 to n, $S(0,j)$ is j because j inserts are needed to convert an empty string to the j-substring of the text. For i from 1 to m and j from 1 to n, if character i of the search string is the same as character j of the text, then $S(i,j)$ is the minimum of $S(i-1,j)+1$, $S(i,j-1)+1$, and $S(i-1,j-1)$ because a method to convert the i-substring of the search string to the j-substring of the text using the fewest possible operations is one of the following.

Delete the last character from the i-substring of the search string, then convert the (i−1)-substring of the search string to the j-substring of the text using the fewest possible operations.

Convert the i-substring of the search string to the (j−1)-substring of the text using the fewest possible operations, then insert the last character of the j-substring of the text at the end of the (j−1)-substring of the text.

Since the last character in the i-substring of the search string is the same as the last character of the text, convert the (i−1)-substring of the search string to the (j−1)-substring of the text using the fewest possible operations, then keep the last character of the i-substring of the search string in place to form the j-substring of the text.

For example, if the i-substring of the search string is "appli" and the j-substring of the text is "analysi," then at least one of the following is a method to convert "appli" to "analysi" using the fewest possible operations.

Delete "i" from "appli" to form "appl," then convert from "appl" to "analysi" using the fewest possible operations.

Convert "appli" to "analys" using the fewest possible operations, then insert "i" at the end to form "analysi."

Convert "appl" to "analys" using the fewest possible operations, then keep the "i" from the end of "appli" to form "analysi."

If the ith character of the search string is not the same as the jth character of the text, then the third option does not exist, so $S(i,j)$ is the minimum of $S(i-1,j)+1$ and $S(i,j-1)+1$.

Computing the subproblems in the order $S(0,0)$, $S(1,0)$, ..., $S(m,0)$, $S(0,1)$, $S(1,1)$, ..., $S(m,1)$, ..., $S(0,n)$, $S(1,n)$, ..., $S(m,n)$ ensures that each subproblem is solved before the solution is used by a recurrence for another subproblem. Note that the m-substring of the search string is the entire search string, and the n-substring of the text is the entire text. So $S(m,n)$ is the simple edit distance between the search string and the text. Hence, solving the sequence of subproblems solves the original problem.

It is possible to perform this computation by hand, as follows. Use a grid. The search string letters correspond to rows 1, 2, ..., m, proceeding from bottom to top. The text letters correspond to columns 1, 2, ..., n, proceeding from left to right. Use a row zero on the bottom and a column zero on the left. Write the search string up a column to the left of the grid, and write the text along a row below the grid. Each grid cell corresponds to a subproblem—the grid cell in row i and column j corresponds to subproblem $S(i,j)$. Compute one column at a time, proceeding left to right. Within each column, compute from the bottom to the top. For each border cell, i.e., each cell in row or column zero, simply fill in the value. For other cells, if the search string character on the row of the cell matches the text character on the column of the cell, then write in the cell the minimum of the following values: the value in the neighboring cell below plus one, the value in the neighboring cell to the left plus one, the value in the neighboring cell diagonally below and left. If the search string and text characters corresponding to the cell row and column do not match, then write in the cell the minimum of the following values: the value in the neighboring cell below plus one, the value in the neighboring cell to the left plus one. When finished, the value in the top right cell is the edit distance between the search string and the text. Here is an example, with search string "apple" and text string "proper."

```
e|5 4 5 6 5 4 5
l|4 3 4 5 4 5 6
p|3 2 3 4 3 4 5
p|2 1 2 3 4 5 6
a|1 2 3 4 5 6 7
|0 1 2 3 4 5 6
```
proper In this example, the edit distance between "apple" and "proper" is five. (The string "apple" can be converted to the string "proper" by deleting the two characters "a" and "l" and inserting the three characters "r", "o", and "r.")

SUMMARY OF THE INVENTION

The values in each column are determined by the search string and the prefix of the text string that ends with the character corresponding to the column. So when the edit distances are computed between a search string and two text strings that share a prefix, the columns corresponding to the prefix are the same for both grids. For example, if, after computing the edit distance between "apple" and "proper," the next task is to compute the edit distance between "apple" and "propeller," then the first six columns of the "apple"-"proper" grid can be re-used as the first six columns of the "apple"-"propeller" grid. (This is illustrated in FIG. 1.) For many edit distances, when computing edit distances from a search string to multiple texts, it is possible to re-use columns corresponding to prefixes shared by successive texts. Refer to this practice as prefix column sharing.

For the edit distance used in the example, it is impossible to have a cell with value less than the minimum cell value in the previous column. (This property is true for many edit distances.) To see why, first consider the bottom cell in a column. The value is one greater then the value of the bottom cell in the previous column, so the value is at least as great as the minimum value in the previous column. Now consider whether the property holds for another cell. The recurrence ensures that the cell value is at least the minimum of the neighboring cells left, diagonally left and below, and below. The first two neighbors are in the previous column. So, if the property holds for the neighboring cell below, then it holds for the cell. So the fact that it holds for the bottom cell implies that it holds for all cells in the column.

Since the edit distance is the value of a cell in the rightmost column, the minimum value in each column is a lower bound for the edit distance. If the goal is to determine whether edit distance is less than a threshold, then the minimum value can be determined after each column computation, and the grid computation can be abandoned if a column minimum is at least the threshold. Refer to this practice as column bounding.

The invention is a process to identify among a list of texts those that have edit distance from a search string that is less than a threshold. The process uses column bounding and prefix column sharing to reduce computation, increasing speed. The process is as follows. Begin with the first text from the list as the first computation text. Perform a column-by-column grid computation of edit distance between the search string and the computation text, stopping early if a column minimum value is at least the threshold. If the edit distance is computed and is below the threshold, then report that the computation text is close to the search string in edit distance. If all columns are computed, then set the next computation text to the next text in the list after the present computation text. If not all columns are computed, then the prefix of the text corresponding to the columns up to and including the column with minimum at least the threshold is a "forbidden prefix." So set the next computation text to the next text in the list after the present computation text that does not share the forbidden prefix. For the next computation text, apply the same procedure as for the first computation text, but re-use columns corresponding to any prefix shared with the present computation text. Continue until the text list is exhausted.

BRIEF DESCRIPTION OF THE DRAWING

FIG. 1 illustrates re-using columns that correspond to a shared prefix;

FIG. 2 illustrates text list processing;

FIG. 3 illustrates computing column banks; and

FIG. 4 illustrates re-using columns that correspond to recurrence-preserving characters.

DETAILED DESCRIPTION OF PREFERRED EMBODIMENTS

The process to identify among a list of texts those that have edit distance from a search string that is less can a threshold can be embodied in a system, wherein the system contains hardware, or in instructions stored in a computer readable storage medium, wherein a computer readable storage medium such as a memory and a disc, in which multiple search strings are to be the subject of the search; the search strings may not be known a priori; the text list is known a priori, and one goal is to perform each search process quickly. The system preprocesses the text list once and then uses the preprocessed list for multiple search processes. Text list preprocessing is described first. Next, the search process is described. Then optional enhancements are described.

Text List Preprocessing

Text list preprocessing includes the following steps.
(1) Sort the text list into lexicographical order.
(2) For each text after the first, determine and record the index of the first character that is different from the previous text. For example, the first difference between "proper" and "propeller" is at position five. If the text is the same as the previous text, then set the index of first difference to one greater than the length of the text.
(3) For each text, for each prefix that is shared by the subsequent and not shared by the previous text, determine and record the index in the text list of the next text that does not share the prefix. (If all subsequent texts share the prefix, then record a value greater than any index in the text list.) Treat the first text as sharing no prefix with a "previous" text. Treat the last text as sharing no prefix with a "subsequent" text.

Sorting places texts with shared prefixes together in the list. The index of first difference is used during the search process to avoid re-computing columns of the dynamic programming grid that correspond to the prefix shared with the previous text. The next text that does not share a prefix is used during the search process to skip any texts after the first that share a prefix that causes edit distance to be the threshold or greater.

FIG. 2 illustrates a preprocessed text list. Here is a detailed description of the figure. The index of the "first different character" from the previous text supports column re-use for shared prefixes. The list of "(prefix, index of next text lacking the prefix)" supports avoiding computation for texts that share a prefix that causes edit distance to exceed a threshold. (A prefix occurs in a list if it is not shared with the previous text and is shared with the subsequent text.)

Search Process

The search process uses a grid for dynamic programming, the preprocessed text list, and variables including a computation text and a column counter. Rows and columns are indexed starting with zero. Row zero is a border row, and row one corresponds to the first character in the search string. Column zero is a border column, and column one corresponds to the first character in the computation text. The search process includes the following steps.
(1) Allocate grid storage with enough rows to accomodate the search string plus a border row and enough columns to accomodate the longest list text plus a border column.
(2) Compute values for grid border cells, i.e., row zero and column zero.
(3) Set the computation text to the first list text.
(4) Set the column counter to one.
(5) If the column counter is greater than the length of the computation text, then:
(5a) Get the edit distance, which is the value in the grid cell on the row corresponding to the last character of the search string and the column corresponding to the last character of the computation text. If the edit distance is less than the threshold, then report the computation text and edit distance.
(5b) If the computation text is the final text in the list, then stop.
(5c) Set the computation text to the next list text after the present computation text.
(5d) Set the column counter to the index of first difference between the computation text and the previous list text, plus one. (Get the index of first difference from the preprocessing on the text list.)
(5e) Go to step (5).
(6) Compute the column indexed by the column counter. (Use the recurrence corresponding to the edit distance.)
(7) If the minimum value in the column indexed by the column counter is no greater than the threshold, then increase the column counter by one and got to step (5). Otherwise:
(7a) The "forbidden prefix" is the prefix of the computation text with length equal to the column counter. Set the computation text to the first list text after the present computation text that does not have the forbidden prefix. (Use the preprocessing on the text list to get the next list text without the forbidden prefix.)
(7b) Set the column counter to the index of first difference between the computation text and the previous list text, plus one. (Get the index of first difference from the preprocessing on the text list.)
(7c) Go to step (5).

Enhancements

There are enhancements that can improve the speed of the search process. The enhancements described here are as follows. First, for each column, avoid computing top and bottom portions in which all values are at least the threshold, i.e., limit each computation to a band of cells. Second, make an alternative text list in which rare characters are consolidated into a single character, and use the alternative text list for search strings in which none of the rare characters occur. Third, avoid re-computing some columns for which the recurrence is the same for the corresponding present text character as for the corresponding previous text character.

Column Bands

For many edit distances, a cell value must be at least as great as the least of the cell to the left, the cell to the left and below, and the cell below. This information can be used to avoid computing some cells that have value at least the threshold. After a column is computed, the range of rows from the lowest cell with value less than the threshold to the highest cell with value less than the threshold is identified. In the next column, the cells below this range are not computed (if the bottom border cell has value at least the threshold); the cells along this range and one higher are computed normally, and the cells above are computed based only on each cell below, until a cell with value at least the threshold is computed (or the top of the column is reached.) To prepare for this, the cell below the range in the computed column and the cell below and the cell above the range in the previous column are seeded with the threshold so that they do not affect computed cell values. Especially if the threshold is low, this enhancement can limit the computation to a narrow band across the grid from lower left to upper right.

FIG. 3 illustrates computing column bands. The figure illustrates which grid values are computed for a threshold value of four. Using the strategy of computing column bands, only the cells shown with values are computed. For each column except the last, the circled cells bound the range of cells from the bottom cell to the top cell having value less than the threshold. Cells to the right of cells in this range are computed normally. So is the cell above the cells to the right. Then cells above are computed until a value is at least the threshold.

Rare Character Consolidation

For many edit distances, the edit distance between a search string and a text remains the same if each text character that is not in the search string is replaced by another character that is not in the search string. Choose a set of characters that rarely occur in search strings, and refer to the set as the "rare set." Choose a character from the set, and refer to it as the "rare representative." Make an alternative text list, replacing each occurence of a character in the rare set by the rare representative. Then preprocess the alternative text list. When a search is performed, if the search string lacks all characters in the rare set, then use the alternative text list rather than the original text list. Since the alternative text list has fewer different characters than the original, it is more likely to have more shared prefixes, likely increasing search speed. It is possible to keep several alternative text lists, each based on a different rare set, and choose which one to use for each search.

Recurrence-Preserving Characters

For many edit distances, the recurrence function for a cell value remains the same if the corresponding search string character remains the same, the corresponding text character changes from one to another of the characters different from the corresponding search string character. With this property, if the cells referenced by the recurrence keep the same values, then the cell value remains the same. For example, this property holds for simple edit distance. So, for a cell, if the corresponding search string character remains the same, the corresponding text character changes from one to another of the characters different from the corresponding search string character, and the values of the neighboring cells left, diagonally below and left, and below remain the same, then the cell value remains the same. This property implies that, for a column, if the search string remains the same, the previous column remains the same, the bottom cell of the column remains the same, and the text character corresponding to the column changes from one to another of the characters not in the search string, then the column cell values remain the same. To see this, apply the cell property to each cell in the column, starting with the first cell above the bottom cell and proceeding up the column.

Consider the following example, using simple edit distance. A grid is computed for search string "search" and computation text "prexyzh." Then the computation text is set to "pretyvw." The columns corresponding to "pre" can be re-used because "pre" is a shared prefix between the new and old computation texts. The column corresponding to "x" in the old computation text and to "t" in the new computation text can be re-used because neither character is in the search string and the previous column must remain the same since it can be re-used. The column corresponding to "y" in both old and new computation texts can be re-used because the character is the same and the previous column must remain the same since it can be re-used. The column corresponding to "x" in the old computation text and to "t" in the new computation text can be re-used because neither character is in the search string and the previous column must remain the same since it can be re-used. Only the final column needs to be re-computed. In general, a column may be re-used for a new computation text if the previous column is the same as for the old computation text, and at least one of the following conditions holds.

The characters corresponding to the column in the new and old computation texts are the same.

The search string lacks the characters corresponding to the column in the new and old computation texts.

FIG. 4 illustrates re-using columns that correspond to recurrence-preserving characters. Here is a detailed description of the figure. In case A, the first two columns correspond to a shared prefix. In case B, in each text the column corresponds to a character not found in the search string, i.e., neither "s" nor "p" occurs in "brink." In case C, the column corresponds to the same character in each text. In case D, in each text the column corresponds to a character not found in the search string. In each case, the columns from the top computation are the same as in the bottom computation, so they can be re-used without being re-computed.

One way to implement this enhancement is as follows.

Prior to each search, form an indicator vector indexed by characters that indicates whether each character is in the search string.

Within each search string-computation text computation, use a variable to indicate whether the previous column remains the same for the new and old computation texts. If a column is re-used, then set the variable to true. If a column is computed, then set the variable to true at the start of the column computation, and set it to false if a column cell value changes.

Before computing each column, perform the following tests. If the variable indicates the previous column remains the same for the new and old computation texts and the characters corresponding to the column in the new and old computation texts are the same, then re-use the column. If the variable indicates the previous column remains the same for the new and old computation texts and the indicator vector indicates that the search string lacks the characters corresponding to the column in the new and old computation texts, then re-use the column.

For a simpler implementation, assume each previous column remains the same for the new and old computation texts until a column is not re-used. Starting with the first column not re-used, compute all columns. After the first column not re-used, no longer evaluate the conditions for re-use. This implementation requires neither a variable to indicate whether the previous column remains the same for the new and old computation texts nor computation during column computation to determine whether column values remain the same.

The enhancements based on recurrence-preserving characters can be applied to an implementation that uses the column bands enhancement. For a column, refer to the range of rows to be computed using the full recurrence as the band. Refer to the search string characters that correspond to the band as the search band. Then a column may be re-used if the cells in the previous column that are referenced in the recurrences for band cells are the same for the new and old computation texts, and at least one of the following conditions holds.

The characters corresponding to the column in the new and old computation texts are the same.

The search band lacks the characters corresponding to the column in the new and old computation texts.

The implementation methods to determine column re-use are the same as without the column bands enhancement, except for the following. In place of references to the previous column, use references to the cells in the previous column that are referenced in the recurrences for band cells. In place of references to the column, use references to the band. In place of references to search string characters, use references to band characters. Rather than using an indicator vector to indicate whether a character is in the search string, use a data structure that allows determination of whether a character is within a range of positions in the search string. The structure could be a set of indicator vectors, one for each range of positions in the search string. Alternatively, the structure could be a set of lists of positions (if any) in the search string, with one list for each character.

What is claimed is:

1. A computer-implemented method for identifying, in a list of texts, texts whose edit distance from a search string is less than a threshold value, said method comprising:
   (a) obtaining by a computer the search string and the threshold value;
   (b) selecting by the computer a first text from the list of texts as a present computation text;
   (c) computing by the computer, column-by-column, a grid of edit distance values between the search string and the present computation text, wherein the computing further comprises the steps of:
   after an individual column is computed, identifying a range of rows of the grid extending from a first row that includes a cell of the individual column that has an edit distance value lower than the threshold value to a last row that includes a cell of the individual column that has an edit distance value lower than the threshold value;
   in a next column, not computing the edit distance values of cells in rows of the grid that are below the range, in response to a border cell of the next column having an edit distance value at least equal to the threshold value;
   in the next column, computing the edit distance values of the cells in rows of the grid that are below the range, in response to a border cell of the next column having an edit distance value lower than the threshold value;
   in the next column, computing the edit distance values of the cells in rows of the grid that are in the range and one higher; and
   in the next column, computing the edit distance value of each of the individual cells in rows of the grid that are above the range, based only on the edit distance value of a cell that is below each individual cell, only until a cell with an edit distance value at least equal to the threshold value is computed;
   (d) stopping the computing in response to computing a column whose minimum value of edit distance is at least the threshold value;
   (e) in response to completing the computing and a computed edit distance from the present computation text to the search string being below the threshold value, generating by the computer an indication that the edit distance of the present computation text from the search string is less than the threshold value;
   (f) in response to either stopping the computing, or completing the computing and the edit distance from the present computation text to the search string not being below the threshold value, generating by the computer an indication that the edit distance of the present computation text from the search string is not less than the threshold value;
   (g) in response to completing the computing, selecting by the computer a next text, in the list after the present computation text, as the present computation text;
   (h) in response to stopping the computing, selecting by the computer a next text, in the list after the present computation text, as the present computation text, wherein the next text does not share with the present computation text a prefix corresponding to columns of the grid up to and including the column whose minimum value of edit distance is at least the threshold value;
   (i) in response to step (h) returning to step (c);
   (j) in response to step (g), returning to step (c), but re-using in step (c) columns of the grid computed for previous said computation text that correspond to a prefix shared by the previous computation text and the present computation text; and
   (k) continuing to perform steps (c) through (j) until step (g) or step (h) reaches an end of the text list.

2. The method of claim 1, further comprising:
   ordering the text list in a sequence to place text with shared prefixes adjacent to one another in the sequence.

3. The method of claim 1, further comprising:
   prior to step (b), sorting the texts in the list in lexicographical order.

4. The method of claim 1, wherein:
   computing comprises using dynamic programming to perform the computing.

5. A computer-implemented method for identifying, in a list of texts, texts whose edit distance from a search string is less than a threshold value, said method comprising:
   (a) obtaining by a computer the search string and the threshold value;
   (b) selecting by the computer a first text from the list of texts as a present computation text;
   (c) computing by the computer, column-by-column, a grid of edit distance values between the search string and the present computation text, wherein the columns of the grid correspond to characters of the computation text and rows of the grid correspond to characters of the search string;
   (d) stopping the computing in response to computing a column whose minimum value of edit distance is at least the threshold value;
   (e) in response to completing the computing and a computed edit distance from the present computation text to the search string being below the threshold value, generating by the computer an indication that the edit distance of the present computation text from the search string is less than the threshold value;
   (f) in response to either stopping the computing, or completing the computing and the edit distance from the present computation text to the search string not being below the threshold value, generating by the computer an indication that the edit distance of the present computation text from the search string is not less than the threshold value;
   (g) in response to completing the computing, selecting by the computer a next text, in the list after the present computation text, as the present computation text;
   (h) in response to stopping the computing, selecting by the computer a next text, in the list after the present computation text, as the present computation text, wherein the next text does not share with the present computation text a prefix corresponding to columns of the grid up to and including the column whose minimum value of edit distance is at least the threshold value;
   (i) in response to step (h) returning to step (c);
   (j) in response to step (g), returning to step (c), but re-using in step (c) columns of the grid computed for previous said computation text that correspond to a prefix shared by the previous computation text and the present computation text; and (k) continuing to perform steps (c) through (j) until step (g) or step (h) reaches an end of the text list;

(l) making an alternative list of texts to an original said list of texts in which each occurrence in the texts of a character in a set of characters is replaced by a determined character in the set;

(m) in response to the search string lacking all characters in said set of characters, using the alternative list of texts rather than the list of texts to identify those texts whose edit distance from the search string is less than the threshold value; and (n) in response to the search string not lacking all characters in said set, using the list of texts to identify those texts whose edit distance from the search string is less than the threshold value.

6. The method of claim 5, further comprising:
ordering the text list in a sequence to place texts with shared prefixes adjacent one to another in the sequence.

7. The method of claim 5, further comprising:
prior to step (b), sorting the texts in the list in lexicographical order.

8. The method of claim 5, wherein:
computing comprises
using dynamic programming to perform the computing.

9. A computer-implemented method for identifying, in a list of texts, texts whose edit distance from a search string is less than a threshold value, said method comprising:

(a) obtaining by a computer the search string and the threshold value;

(b) selecting by the computer a first text from the list of texts as a present computation text;

(c) computing by the computer, column-by-column, a grid of edit distance values between the search string and the present computation text, wherein the columns of the grid correspond to characters of the computation text and rows of the grid correspond to characters of the search string, and wherein the computing comprises the steps of:

re-using a column of the grid of a previous computation text for an individual column of the grid of the present computation text, in response to the present computation text not being a first said selected computation text and a preceding column of the grid of the present computation text having same edit distance values as a preceding column of the grid of the previous computation text, and at least one of the following conditions being true:

a character corresponding to an individual column of the grid of the present computation text and the character corresponding to the column of the previous computation text are both a same character and not a part of a prefix shared by the previous computation text and the present computation text, the search string lacks the character corresponding to the individual column of the grid of the present computation text and the character corresponding to the column of the previous computation text; and otherwise computing the individual column of the grid of the present computation text;

(d) stopping the computing in response to computing a column whose minimum value of edit distance is at least the threshold value;

(e) in response to completing the computing and a computed edit distance from the present computation text to the search string being below the threshold value, generating by the computer an indication that the edit distance of the present computation text from the search string is less than the threshold value;

(f) in response to either stopping the computing, or completing the computing and the edit distance from the present computation text to the search string not being below the threshold value, generating by the computer an indication that the edit distance of the present computation text from the search string is not less than the threshold value;

(g) in response to completing the computing, selecting by the computer a next text, in the list after the present computation text, as the present computation text;

(h) in response to stopping the computing, selecting by the computer a next text, in the list after the present computation text, as the present computation text, wherein the next text does not share with the present computation text a prefix corresponding to columns of the grid up to and including the column whose minimum value of edit distance is at least the threshold value;

(i) in response to step (h) returning to step (c);

(j) in response to step (g), returning to step (c), but re-using in step (c) columns of the grid computed for previous said computation text that correspond to a prefix shared by the previous computation text and the present computation text; and (k) continuing to perform steps (c) through (j) until step (g) or step (h) reaches an end of the text list.

10. The method of claim 9, further comprising:
ordering the text list in a sequence to place texts with shared prefixes adjacent one to another in the sequence.

11. The method of claim 9, further comprising:
prior to step (b), sorting the texts in the list in lexicographical order.

12. The method of claim 9, wherein:
computing comprises
using dynamic programming to perform the computing.

13. A system for identifying, in a list of texts, texts whose edit distance from a search string is less than a threshold value, said system comprising:

a computer operable to
(a) obtain the search string and the threshold value;
(b) select a first text from the list of texts as a present computation text;
(c) compute, column-by-column, a grid of edit distance values between the search string and the present computation text;

wherein the computer is operable at step (c) to:
after an individual column is computed, identify a range of rows of the grid extending from a first row that includes a cell of the individual column that has an edit distance value lower than the threshold value to a last row that includes a cell of the individual column that has an edit distance value lower than the threshold value;

in a next column, not compute the edit distance values of cells in rows of the grid that are below the range, in response to a border cell of the next column having an edit distance value at least equal to the threshold value;

in the next column, compute the edit distance values of the cells in rows of the grid that are below the range, in response to a border cell of the next column having an edit distance value lower than the threshold value;

in the next column, compute the edit distance values of the cells in rows of the grid that are in the range and one higher; and in the next column, compute the edit distance value of each of the individual cells in rows of the grid that are above the range, based only on the edit distance value of a cell that is below each individual cell, only until a cell with an edit distance value at least equal to the threshold value is computed;

(d) stop the computing in response to computing a column whose minimum value of edit distance is at least the threshold value;

(e) in response to completing the computing and the a computed edit distance from the present computation text to the search string being below the threshold value, generate an indication that the edit distance of the present computation text from the search string is less than the threshold value;

(f) in response to either stopping the computing, or completing the computing and the edit distance from the present computation text to the search string not being below the threshold value, generate an indication that the edit distance of the present computation text from the search string is not less than the threshold value;

(g) in response to completing the computing, select a next text, in the list after the present computation text, as the present computation text;

(h) in response to stopping the computing, select a next text, in the list after the present computation text, as the present computation text, wherein the next text does not share with the present computation text a prefix corresponding to columns of the grid up to and including the column whose minimum value of edit distance is at least the threshold value;

(i) in response to step (h) returning to step (c);

(j) in response to step (g), returning to step (c), but re-using in step (c) columns of the grid computed for previous said computation text that correspond to a prefix shared by the previous computation text and the present computation text; and (k) continue to perform steps (c) through (j) until step (g) or step (h) reaches an end of the text list.

14. The system of claim 13, wherein the computer is operable to:

order the text list in a sequence to place texts with shared prefixed adjacent one to another in the sequence.

15. The system of claim 13, wherein the computer is further operable to:

prior to step (b), sort the texts in the list in lexicographical order.

16. The system of claim 13, wherein the computer is adapted to use dynamic programming to comput the grid.

17. A system for identifying, in a list of texts, texts whose edit distance from a search string is less than a threshold value, said system comprising:

a computer operable to (a) obtain the search string and the threshold value;

(b) select a first text from the list of texts as a present computation text;

(c) compute, column-by-column, a grid of edit distance values between the search string and the present computation text, wherein the columns of the grid correspond to characters of the computation text and rows of the grid correspond to characters of the search string;

(d) stop the computing in response to computing a column whose minimum value of edit distance is at least the threshold value;

(e) in response to completing the computing and a computed edit distance from the present computation text to the search string being below the threshold value, generate an indication that the edit distance of the present computation text from the search string is less than the threshold value;

(f) in response to either stopping the computing, or completing the computing and the edit distance from the present computation text to the search string not being below the threshold value, generate an indication that the edit distance of the present computation text from the search string is not less than the threshold value;

(g) in response to completing the computing, select a next text, in the list after the present computation text, as the present computation text;

(h) in response to stopping the computing, select a next text, in the list after the present computation text, as the present computation text, wherein the next text does not share with the present computation text a prefix corresponding to columns of the grid up to and including the column whose minimum value of edit distance is at least the threshold value, as the present computation text;

(i) in response to step (h) returning to step (c);

(j) in response to step (g), returning to step (c), but re-using in step (c) columns of the grid computed for previous said computation text that correspond to a prefix shared by the previous computation text and the present computation text; and (k) continue to perform steps (c) through (j) until step (g) or step (h) reaches an end of the text list;

(l) make an alternative list of texts to an original said list of texts in which each occurrence in the texts of a character in a set of characters is replaced by a determined character in the set;

(m) in response to the search string lacking all characters in said set of characters, use the alternative list of texts rather than the list of texts to identify those texts whose edit distance from the search string is less than the threshold value; and (n) in response to the search string not lacking all characters in said set, use the original list of texts to identify those texts whose edit distance from the search string is less than the threshold value.

18. The system of claim 17, wherein the computer is operable to:

order the text list in a sequence to place texts with shared prefixes adjacent one to another in the sequence.

19. The system of claim 17, wherein the computer is further operable to:

prior to step (b), sort the texts in the list in lexicographical order.

20. The system of claim 17, wherein:

the computer is adapted to use dynamic programming to compute the grid.

21. A system for identifying, in a list of texts, texts whose edit distance from a search string is less than a threshold value, said system comprising:

a computer operable to (a) obtain the search string and the threshold value;

(b) select a first text from the list of texts as a present computation text;

(c) compute, column-by-column, a grid of edit distance values between the search string and the present computation text, wherein the columns of the grid correspond to characters of the computation text and rows of the grid correspond to characters of the search string, and wherein the computer is operable at step (c) to:

re-use a column of the grid of a previous computation text for an individual column of the grid of the present computation text, in response to the present computation text not being a first said selected computation text and a preceding column of the grid of the present computation text having same edit distance values as a preceding column of the grid of the previous computation text, and at least one of the following conditions being true:

a character corresponding to an individual column of the grid of the present computation text and the character corresponding to the column of the previous computation text are both a same character and not a part of a prefix shared by the previous computation text and the present computation text, the search string lacks the character corresponding to the individual column of the grid of the present computation text and the character corresponding to the column of the previous computation text; and otherwise compute the individual column of the grid of the present computation text;

(d) stop the computing in response to computing a column whose minimum value of edit distance is at least the threshold value;

(e) in response to completing the computing and a computed edit distance from the present computation text to the search string being below the threshold value, generate an indication that the edit distance of the present computation text from the search string is less than the threshold value;

(f) in response to either stopping the computing, or completing the computing and the edit distance from the present computation text to the search string not being below the threshold value, generate an indication that the edit distance of the present computation text from the search string is not less than the threshold value;

(g) in response to completing the computing, select a next text, in the list after the present computation text, as the present computation text;

(h) in response to stopping the computing, select a next text, in the list after the present computation text, as the present computation text, wherein the next text does not share with the present computation text a prefix corresponding to columns of the grid up to and including the column whose minimum value of edit distance is at least the threshold value;

(i) in response to step (h) returning to step (c);

(j) in response to step (g), returning to step (c), but re-using in step (c) columns of the grid computed for previous said computation text that correspond to a prefix shared by the previous computation text and the present computation text; and (k) continue to perform steps (c) through (j) until step (g) or step (h) reaches an end of the text list.

22. The system of claim 21, wherein the computer is further operable to:

order the text list in a sequence to place texts with shared prefixes adjacent one to another in the sequence.

23. The system of claim 21, wherein the computer is further operable to:

prior to step (b), sort the texts in the list in lexicographical order.

24. The system of claim 21, wherein:

the computer is adapted to use dynamic programming to compute the grid.

25. A computer-readable storage medium containing instructions which, when executed by a computer, cause the computer to identify, in a list of texts, texts whose edit distance from a search string is less than a threshold value, by performing steps comprising:

(a) obtaining the search string and the threshold value;

(b) selecting a first text from the list of texts as a present computation text;

(c) computing, column-by-column, a grid of edit distance values between the search string and the present computation text;

wherein the instructions cause the computer to perform the computing by further performing steps comprising:

after an individual column is computed, identifying a range of rows of the grid extending from a first row that includes a cell of the individual column that has an edit distance value lower than the threshold value to a last row that includes a cell of the individual column that has an edit distance value lower than the threshold value;

in a next column, not computing the edit distance values of the cells in rows of the grid that are below the range, in response to a border cell of the next column having an edit distance value at least equal to the threshold value;

in the next column, computing the edit distance values of the cells in rows of the grid that are below the range, in response to the a border cell of the next column having an edit distance value lower than the threshold value;

in the next column, computing the edit distance values of the cells in rows of the grid that are in the range and one higher; and in the next column, computing the edit distance value of each of the individual cells in rows of the grid that are above the range, based only on the edit distance value of a cell that is below the each individual cell, only until a cell with an edit distance value at least equal to the threshold value is computed;

(d) stopping the computing in response to computing a column whose minimum value of edit distance is at least the threshold value;

(e) in response to completing the computing and a computed edit distance from the present computation text to the search string being below the threshold value, generating an indication that the edit distance of the present computation text from the search string is less than the threshold value;

(f) in response to either stopping the computing, or completing the computing and the edit distance from the present computation text to the search string not being below the threshold value, generating an indication that the edit distance of the present computation text from the search string is not less than the threshold value;

(g) in response to completing the computing, selecting a next text, in the list after the present computation text, as the present computation text;

(h) in response to stopping the computing, selecting a next text, in the list after the present computation text, as the present computation text, wherein the next text does not share with the present computation text a prefix corresponding to columns of the grid up to and including the column whose minimum value of edit distance is at least the threshold value;

(i) in response to step (h) returning to step (c);

(j) in response to step (g), returning to step (c), but re-using in step (c) columns of the grid computed for previous said computation text that correspond to a prefix shared by the previous computation text and the present computation text; and (k) continuing to perform steps (c) through U) until step (g) or step (h) reaches an end of the text list.

26. The medium of claim 25, further containing instructions which cause the computer to perform:

ordering the text list in a sequence to place texts with shared prefixes adjacent to one another in the sequence.

27. The medium of claim 25, further containing instructions which cause the computer to perform: prior to step (b), sorting the texts in the list in lexicographical order.

28. The medium of claim 25, wherein the instructions cause the computer to perform the step of computing by using dynamic programming.

29. A computer-readable storage medium containing instructions which, when executed by a computer, cause the computer to identify, in a list of texts, these texts whose edit distance from a search string is less than a threshold value, by performing steps comprising:
    (a) obtaining the search string and the threshold value;
    (b) selecting a first text from the list of texts as a present computation text;
    (c) computing, column-by-column, a grid of edit distance values between the search string and the present computation text, wherein the columns of the grid correspond to characters of the computation text and rows of the grid correspond to characters of the search string;
    (d) stopping the computing in response to computing a column whose minimum value of edit distance is at least the threshold value;
    (e) in response to completing the computing and a computed edit distance from the present computation text to the search string being below the threshold value, generating an indication that the edit distance of the present computation text from the search string is less than the threshold value;
    (f) in response to either stopping the computing, or completing the computing and the edit distance from the present computation text to the search string not being below the threshold value, generating an indication that the edit distance of the present computation text from the search string is not less than the threshold value;
    (g) in response to completing the computing, selecting a next text, in the list after the present computation text, as the present computation text;
    (h) in response to stopping the computing, selecting a next text, in the list after the present computation text, as the present computation text, wherein the next text does not share with the present computation text a prefix corresponding to columns of the grid up to and including the column whose minimum value of edit distance is at least the threshold value, as the present computation text;
    (i) in response to step (h) returning to step (c);
    (j) in response to step (g), returning to step (c), but re-using in step (c) columns of the grid computed for previous said computation text that correspond to a prefix shared by the previous computation text and the present computation text; and
    (k) continuing to perform steps (c) through (j) until step (g) or step (h) reaches an end of the text list;
    (l) making an alternative list of texts to an original said list of texts in which each occurrence in the texts of a character in a set of characters is replaced by a determined character in the set;
    (m) in response to the search string lacing all characters in said set of characters, using the alternative list of texts rather than the list of texts to identify those texts whose edit distance from the search string is less than the threshold value; and
    (n) in response to the search string not lacking all characters in said set, using the original list of texts to identify those texts whose edit distance form the search string is less than the threshold value.

30. The medium of claim 29, further containing instructions which cause the computer to perform:
    ordering the text list in a sequence to place texts with shared prefixes adjacent one to another in the sequence.

31. The medium of claim 29, further containing instructions which cause the computer to perform:
    prior to step (b), sorting the texts in the list in lexicographical order.

32. The medium of claim 29, wherein the instructions cause the computer to perform the step of computing by using dynamic programming.

33. A computer-readable storage medium containing instructions which, when executed by a computer, cause the computer to identify, in a list of texts, texts whose edit distance from a search string is less than a threshold value, by performing steps comprising:
    (a) obtaining the search string and the threshold value;
    (b) selecting a first text from the list of texts as a present computation text;
    (c) computing, column-by-column, a grid of edit distance values between the search string and the present computation text, wherein the columns of the grid correspond to characters of the computation text and rows of the grid correspond to characters of the search string, and wherein the instructions cause the computer to perform the computing by performing steps comprising:
    re-using a column of the grid of a previous computation text for an individual column of the grid of the present computation text, in response to the present computation text not being a first said selected computation text and a preceding column of the grid of the present computation text having same edit distance values as a preceding column of the grid of the previous computation text, and at least one of the following conditions being true:
    a character corresponding to an individual column of the grid of the present computation text and the character corresponding to the column of the previous computation text are both a same character and not a part of a prefix shared by the previous computation text and the present computation text,
    the search string lacks the character corresponding to the individual column of the grid of the present computation text and the character corresponding to the column of the previous computation text; and
    otherwise computing the individual column of the grid of the present computation text;
    (d) stopping the computing in response to computing a column whose minimum value of edit distance is at least the threshold value;
    (e) in response to completing the computing and a computed edit distance from the present computation text to the search string being below the threshold value, generating an indication that the edit distance of the present computation text from the search string is less than the threshold value;
    (f) in response to either stopping the computing, or completing the computing and the edit distance from the present computation text to the search string not being below the threshold value, generating an indication that the edit distance of the present computation text from the search string is not less than the threshold value;
    (g) in response to completing the computing, selecting a next text, in the list after the present computation text, as the present computation text;
    (h) in response to stopping the computing, selecting a next text, in the list after the present computation text, as the present computation text, wherein the next text that does not share with the present computation text a prefix corresponding to columns of the grid up to and including the column whose minimum value of edit distance is at least the threshold value;

(i) in response to step (h) returning to step (c);

(j) in response to step (g), returning to step (c), but re-using in step (c) columns of the grid computed for previous said computation text that correspond to a prefix shared by the previous computation text and the present computation text; and (k) continuing to perform steps (c) through (j) until step (g) or step (h) reaches an end of the text list.

34. The medium of claim 33, further containing instructions which cause the computer to perform:

ordering the text list in a sequence to place texts with shared prefixes adjacent one to another in the sequence.

35. The medium of claim 33, further containing instructions which cause the computer to perform:

prior to step (b), sorting the texts in the list in lexicographical order.

36. The medium of claim 33, wherein the instructions cause the computer to perform the step of computing by using dynamic programming.

* * * * *